(12) United States Patent
Bhakta et al.

(10) Patent No.: US 12,360,373 B1
(45) Date of Patent: Jul. 15, 2025

(54) OPTICAL SYSTEMS WITH WAVEGUIDE DEFORMATION MITIGATION STRUCTURES

(71) Applicant: Apple Inc., Cupertino, CA (US)

(72) Inventors: Vikrant Bhakta, Santa Clara, CA (US); Guolin Peng, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 515 days.

(21) Appl. No.: 17/899,415

(22) Filed: Aug. 30, 2022

Related U.S. Application Data

(60) Provisional application No. 63/240,240, filed on Sep. 2, 2021.

(51) Int. Cl.
*G02B 27/01* (2006.01)

(52) U.S. Cl.
CPC .... *G02B 27/0172* (2013.01); *G02B 2027/011* (2013.01)

(58) Field of Classification Search
CPC .......... G02B 27/0172; G02B 2027/011; G02B 27/01; G02B 27/0101; G02B 27/0103; G02B 27/0149; G02B 27/017; G02B 27/0176; G02B 27/0179; G02B 27/0189; G02B 2027/0105; G02B 2027/0107; G02B 2027/0109; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154;
(Continued)

(56) References Cited

U.S. PATENT DOCUMENTS 10,228,562 B2  3/2019  Stafford et al.
10,529,063 B2  1/2020  Rodriguez et al.
(Continued)

OTHER PUBLICATIONS

U.S. Appl. No. 17/423,616, filed Jul. 16, 2021.

*Primary Examiner* — Henry Duong
(74) *Attorney, Agent, or Firm* — Treyz Law Group, P.C.; Michael H. Lyons

(57) ABSTRACT

A display system may include a waveguide and an input coupling prism. The waveguide may have a lateral surface with a deformed region. The prism may couple the light into the waveguide at an angle whereby the light first reflects off the deformed region. The display module may include a display panel that provides the light with planar wavefronts. The display module may include a deformation mitigation structure that distorts the planar wavefronts to produce non-planar wavefronts. The shape of the non-planar wavefronts may be selected to reverse distortion to the wavefronts of the light produced by the first reflection of the light off the deformed region of the lateral surface. This may serve to mitigate distortion in the light produced by the deformed region of the lateral surface and may serve to maximize the sharpness images in the image light provided to an eye box.

16 Claims, 5 Drawing Sheets

(58) Field of Classification Search
CPC .... G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198
USPC ....................................................... 359/630
See application file for complete search history.

(56) References Cited

U.S. PATENT DOCUMENTS

| | | |
|---|---|---|
| 10,983,346 B2 | 4/2021 | Vallius et al. |
| 11,009,707 B2 | 5/2021 | Peng et al. |
| 2019/0072767 A1* | 3/2019 | Vallius ................... H04N 9/646 |
| 2022/0091419 A1* | 3/2022 | Angervaks ......... G02B 27/4216 |
| 2022/0187605 A1 | 6/2022 | Mills et al. |

* cited by examiner

OPTICAL SYSTEMS WITH WAVEGUIDE DEFORMATION MITIGATION STRUCTURES

This application claims the benefit of U.S. Provisional Patent Application No. 63/240,240, filed Sep. 2, 2021, which is hereby incorporated by reference herein in its entirety.

BACKGROUND

This disclosure relates generally to optical systems and, more particularly, to optical systems for electronic devices with displays.

Electronic devices often include displays that present images close to a user's eyes. For example, virtual and augmented reality headsets may include displays with optical elements that allow users to view the displays.

Devices such as these can be challenging to design. If care is not taken, the components used to display images in these devices can be unsightly and bulky and may not exhibit a desired optical performance. For example, deformation in the components can cause the images to appear distorted.

SUMMARY

An electronic device may have a display system. The display system may include a waveguide having waveguide substrates and a grating medium sandwiched between the waveguide substrates. An optical coupler may be disposed in the grating medium for directing image light towards an eye box. An input coupling prism may be mounted to the waveguide. The waveguide may have a lateral surface with a deformed region from the manufacturing process for the waveguide.

A display module may provide image light to the waveguide. The input coupling prism may couple the image light into the waveguide at an angle whereby the image light first reflects off the deformed region of the lateral surface. The display module may include a waveguide deformation mitigation structure and a display panel. The waveguide deformation mitigation structure may include an optical wedge with a curved surface or a curved surface of one or more lens elements in collimating optics of the display module, as examples.

The display panel may provide the image light with planar wavefronts. The mitigation structure may distort the planar wavefronts to produce non-planar wavefronts. The shape of the non-planar wavefronts may be selected to reverse distortion to the wavefronts of the image light produced by the first reflection of the image light off the deformed region of the lateral surface. This may serve to mitigate distortion in the image light produced by the deformed region of the lateral surface and may serve to maximize the sharpness the images in the image light provided to the eye box.

DETAILED DESCRIPTION

Figure 1:
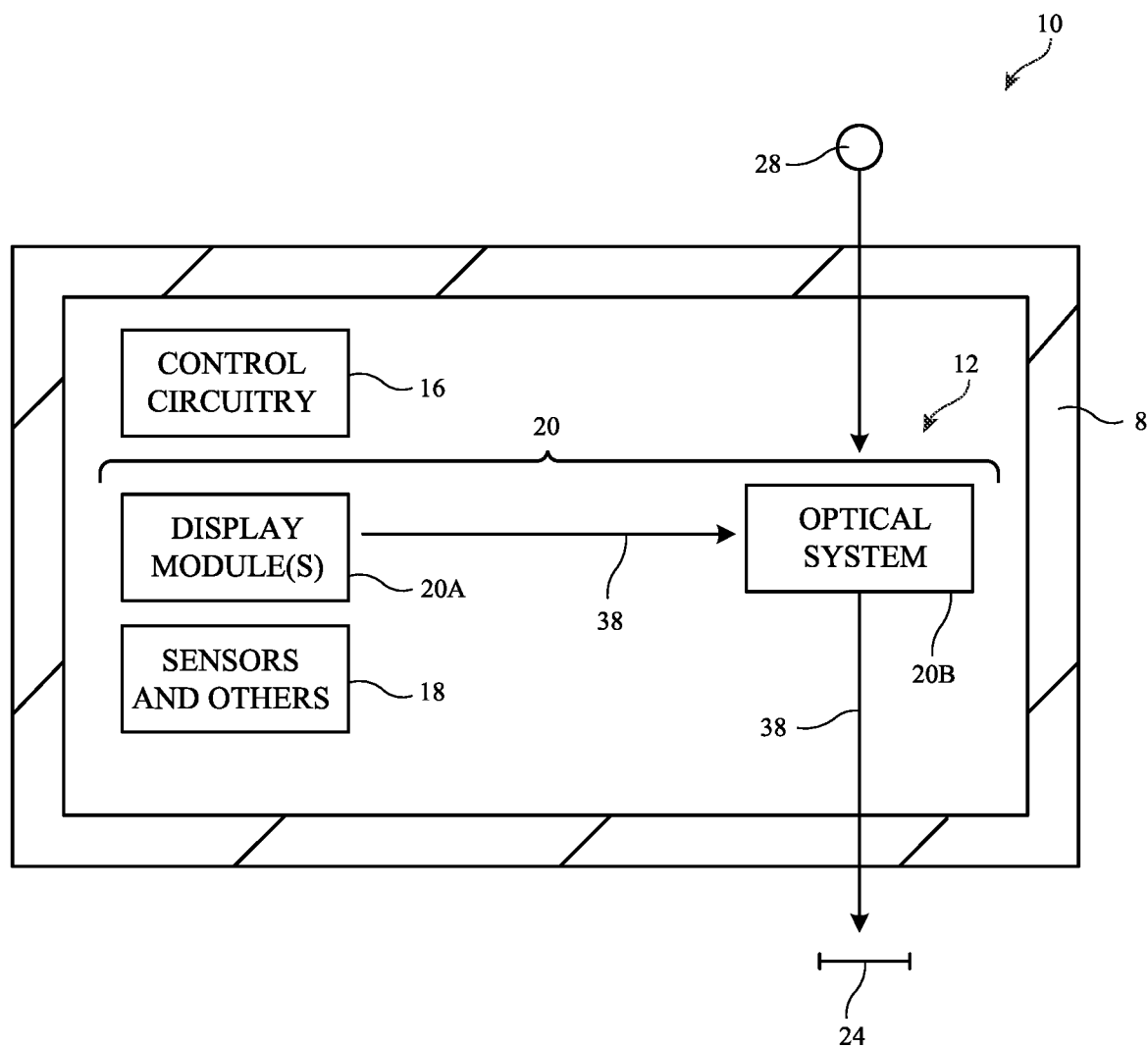
FIG. 1 is a diagram of an illustrative system having a display in accordance with some embodiments.

System 10 of FIG. 1 may be a head-mounted device having one or more displays. The displays in system 10 may include near-eye displays 20 mounted within support structure (housing) 8. Support structure 8 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display modules such as display modules 20A and one or more optical systems such as optical systems 20B. Display modules 20A may be mounted in a support structure such as support structure 8. Each display module 20A may emit light 38 (image light) that is redirected towards a user's eyes at eye box 24 using an associated one of optical systems 20B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 20A may be liquid crystal displays, organic light-emitting diode displays, laser-based displays, or displays of other types. Display modules 20A may include light sources, emissive display panels, transmissive display panels that are illuminated with illumination light from light sources to produce image light, reflective display panels such as digital micromirror display (DMD) panels and/or liquid crystal on silicon (LCOS) display panels that are illuminated with illumination light from light sources to produce image light, etc.

Optical systems 20B may form lenses that allow a viewer (see, e.g., a viewer's eyes at eye box 24) to view images on display(s) 20. There may be two optical systems 20B (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 20B may be selected so that any gap present between the displays will not be visible to a user (e.g., so that the images of the left and right displays overlap or merge seamlessly).

If desired, optical system 20B may contain components (e.g., an optical combiner, etc.) to allow real-world image light from real-world images or objects to be combined optically with virtual (computer-generated) images such as virtual images in image light 38. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of external objects and this content is digitally merged with virtual content at optical system 20B).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2:
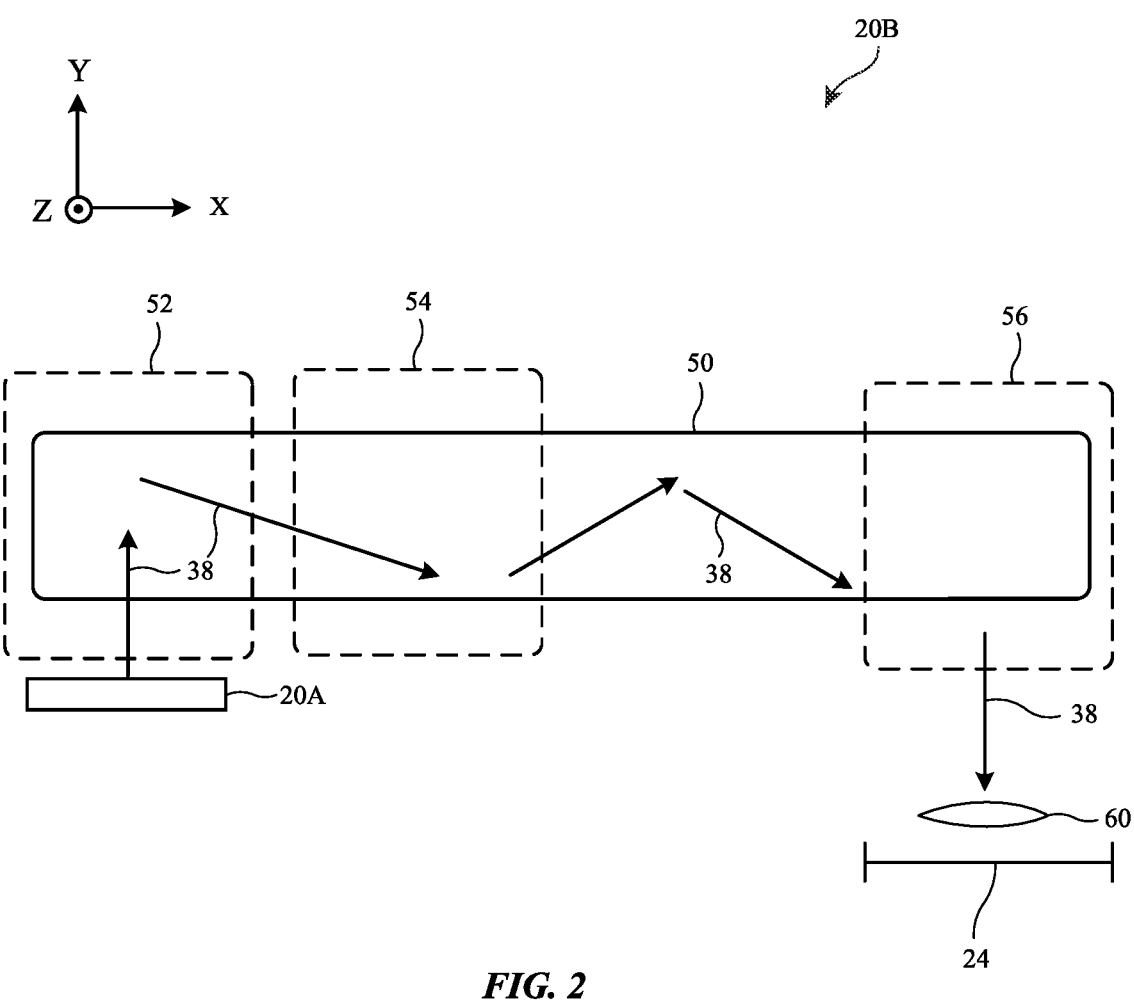
FIG. 2 is a top view of an illustrative optical system for a display having a waveguide with optical couplers in accordance with some embodiments.

FIG. 2 is a top view of an illustrative display 20 that may be used in system 10 of FIG. 1. As shown in FIG. 2, near-eye display 20 may include one or more display modules such as display module(s) 20A and an optical system such as optical system 20B. Optical system 20B may include optical elements such as one or more waveguides 50. Waveguide 50 may include one or more stacked substrates (e.g., stacked planar and/or curved layers sometimes referred to herein as waveguide substrates) of optically transparent material such as plastic, polymer, glass, etc.

If desired, waveguide 50 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 50 may include holographic phase gratings such as volume holograms or thin-film holograms, meta-gratings, or any other desired diffractive grating structures. The diffractive gratings on waveguide 50 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 50 if desired.

As shown in FIG. 2, display module 20A may generate image light 38 associated with image content to be displayed to eye box 24 (e.g., image light 38 may convey a series of image frames for display at eye box 24). Image light 38 may be collimated using a collimating lens if desired. Optical system 20B may be used to present image light 38 output from display module 20A to eye box 24. If desired, display module 20A may be mounted within support structure 8 of FIG. 1 while optical system 20B may be mounted between portions of support structure 8 (e.g., to form a lens that aligns with eye box 24). Other mounting arrangements may be used, if desired.

Optical system 20B may include one or more optical couplers (e.g., light redirecting elements) such as input coupler 52, cross-coupler 54, and output coupler 56. In the example of FIG. 2, input coupler 52, cross-coupler 54, and output coupler 56 are formed at or on waveguide 50. Input coupler 52, cross-coupler 54, and/or output coupler 56 may be completely embedded within the substrate layers of waveguide 50, may be partially embedded within the substrate layers of waveguide 50, may be mounted to waveguide 50 (e.g., mounted to an exterior surface of waveguide 50), etc.

Waveguide 50 may guide image light 38 down its length via total internal reflection. Input coupler 52 may be configured to couple image light 38 from display module 20A into waveguide 50, whereas output coupler 56 may be configured to couple image light 38 from within waveguide 50 to the exterior of waveguide 50 and towards eye box 24. Input coupler 52 may include an input coupling prism, an edge or face of waveguide 50, a lens, a steering mirror or liquid crystal steering element, or any other desired input coupling elements. As an example, display module 20A may emit image light 38 in direction +Y towards optical system 20B. When image light 38 strikes input coupler 52, input coupler 52 may redirect image light 38 so that the light propagates within waveguide 50 via total internal reflection towards output coupler 56 (e.g., in direction +X within the total internal reflection (TIR) range of waveguide 50). When image light 38 strikes output coupler 56, output coupler 56 may redirect image light 38 out of waveguide 50 towards eye box 24 (e.g., back along the Y-axis). A lens such as lens 60 may help to direct or focus image light 38 onto eye box 24. Lens 60 may be omitted if desired. In scenarios where cross-coupler 54 is formed on waveguide 50, cross-coupler 54 may redirect image light 38 in one or more directions as it propagates down the length of waveguide 50, for example. In redirecting image light 38, cross-coupler 54 may also perform pupil expansion on image light 38.

Input coupler 52, cross-coupler 54, and/or output coupler 56 may be based on reflective and refractive optics or may be based on diffractive (e.g., holographic) optics. In arrangements where couplers 52, 54, and 56 are formed from reflective and refractive optics, couplers 52, 54, and 56 may include one or more reflectors (e.g., an array of micromirrors, partial mirrors, louvered mirrors, or other reflectors). In arrangements where couplers 52, 54, and 56 are based on diffractive optics, couplers 52, 54, and 56 may include diffractive gratings (e.g., volume holograms, surface relief gratings, etc.).

The example of FIG. 2 is merely illustrative. Optical system 14B may include multiple waveguides that are laterally and/or vertically stacked with respect to each other. Each waveguide may include one, two, all, or none of couplers 52, 54, and 56. Waveguide 50 may be at least partially curved or bent if desired. One or more of couplers 52, 54, and 56 may be omitted. If desired, optical system 20B may include an optical coupler that performs the operations of both cross-coupler 54 and output coupler 56 (sometimes referred to herein as an interleaved coupler, a diamond coupler, or a diamond expander).

Figure 3:
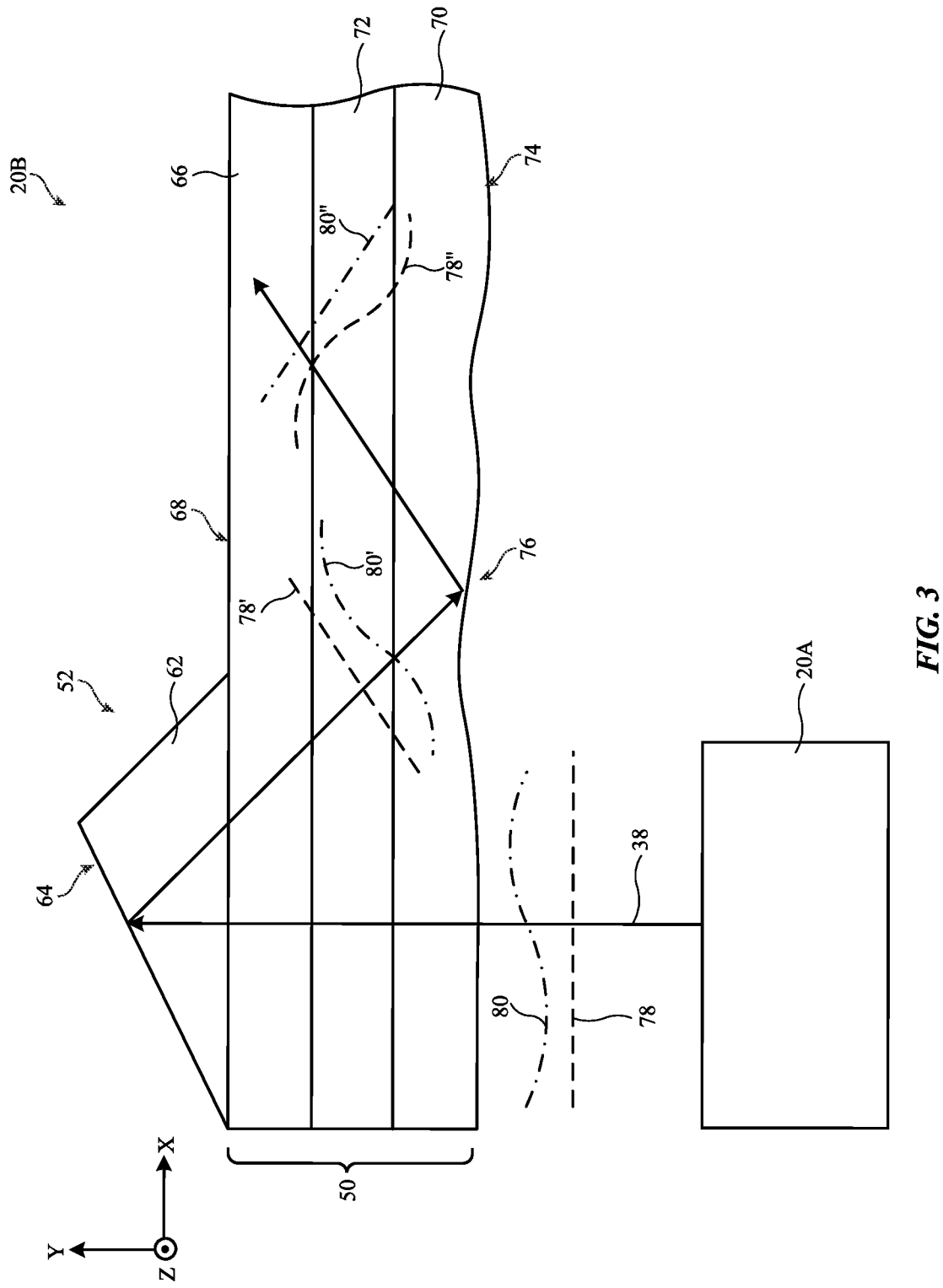
FIG. 3 is a top view of an illustrative optical system having a waveguide and having a display module with a waveguide deformation mitigation structure in accordance with some embodiments.

FIG. 3 is a top view showing one example of how image light 38 produced by display module 20A may be coupled into waveguide 50. As shown in FIG. 3, waveguide 50 may include one or more stacked waveguide substrate layers such as waveguide substrates 66 and 70. One or more media layers (e.g., layers of grating medium) may be embedded within or otherwise disposed on waveguide 50. Waveguide substrate 66 may have a lateral (e.g., planar) surface such as lateral surface 68 and an opposing surface that contacts grating medium 72. Lateral surface 68 may, for example, form an external (exterior) surface of waveguide 50. Waveguide substrate 70 may have a (nominally) lateral surface (e.g., planar surface) such as lateral surface 74 and an opposing surface that contacts grating medium 72. Lateral surface 74 may, for example, form an external (exterior) surface of waveguide 50 that faces display module 20A.

As shown in the example of FIG. 3, a layer of grating medium such as grating medium 72 may be interposed (sandwiched) between waveguide substrates 66 and 70. Diffractive gratings such as phase gratings (e.g., volume holograms) and/or surface relief gratings may be formed (e.g., recorded) in grating medium 72 and/or louvered mirrors may be embedded within grating medium 72 for forming one or more optical couplers. As examples, diffractive gratings and/or louvered mirrors in grating medium 72 may form some or all of cross-coupler 54 (FIG. 2), some or all of output coupler 56, and/or some or all of an interleaved coupler.

Input coupler 52 on waveguide 50 may include an input coupling prism such as reflective input coupling prism 62. Reflective input coupling prism 62 may be mounted to lateral surface 68 of waveguide substrate 66 (e.g., waveguide 50 may be interposed between reflective input coupling prism 62 and display module 20A). The image light 38 emitted by display module 20A may pass through waveguide substrate 70, grating medium 72, and waveguide substrate 66 into reflective input coupling prism 62. Image light 38 may reflect off reflective surface 64 of reflective input coupling prism 62 and into waveguide 50 at angles within the total internal reflection (TIR) range of waveguide 50. The image light 38 reflected by reflective input coupling prism 62 may reflect off lateral surface 74 of waveguide substrate 70 and may continue to propagate along waveguide 50 via TIR until being redirected (e.g., diffracted) by an optical coupler on waveguide 50 (e.g., within grating medium 72).

In general, grating medium 72 is formed from a different material having different material properties than waveguide substrates 66 and 70 (e.g., waveguide substrates 66 and 70 may be formed from glass whereas grating medium 72 is formed from a holographic recording material). In the process of manufacturing waveguide 50 and/or mounting input coupler 52 to waveguide 50, these material differences may cause portions of waveguide substrate 66 and/or 70 to warp or deform. For example, a portion of lateral surface 74 may become deformed (warped) within region 76 such that region 76 is no longer perfectly planar (e.g., the deformation from perfectly planar may as small as on the order of microns or nm). Region 76 may sometimes be referred to herein as deformed region 76, warped region 76, distorted region 76, or non-planar region 76. The deformation of lateral surface 74 within deformed region 76 may produce distortions to the image light 38 when the image light first reflects off lateral surface 74 in propagating along waveguide 50 via TIR.

For example, as shown in FIG. 3, display module 20A may emit image light 38 having planar and parallel wavefronts 78 (e.g., image light 38 may be approximated by plane waves at waveguide 50). Planar wavefronts 78 may pass through waveguide 50 and may reflect off reflective input coupling prism 62 within the TIR range of the waveguide (e.g., within an input pupil of waveguide 50) while maintaining planarity, as shown by planar wavefronts 78'.

However, the first reflection (bounce) of image light 38 within waveguide 50 may occur within deformed region 76 of waveguide substrate 74. In reflecting image light 38 for the first time, the non-planar shape (profile) of deformed region 76 of waveguide substrate 74 may alter (distort) planar wavefronts 78' to produce non-planar (distorted) wavefronts 78". These distorted wavefronts (sometimes referred to as wavefront errors) may cause the images in image light 38 to appear distorted or with a limited resolution by the time image light 38 reaches eye box 24 (FIG. 2).

To mitigate the distortion imparted to image light 38 by deformed region 76 of waveguide substrate 70, display module 20A may include a waveguide distortion (deformation) mitigation structure. In emitting image light 38, display module 20A may transmit image light 38 through the waveguide deformation mitigation structure. The waveguide deformation mitigation structure may perform field dependent wavefront error correction (pre-compensation) on image light 38 that causes display module 20A to emit image light 38 with corrected (pre-compensated) non-planar wavefronts 80.

The waveguide deformation mitigation structure may impart a field dependent wavefront error correction to image light 38 that is opposite to the wavefront errors imparted to image light 38 by deformed region 76 of waveguide substrate 70 (e.g., the distortion from planarity in wavefronts 80 may be approximately equal and opposite to that imparted to image light 38 by the geometry of deformed region 76 of waveguide substrate 70). The non-planar wavefronts 80 of image light 38 may pass through waveguide 50 and reflect off reflective input coupling prism 62 while maintaining non-planarity, as shown by non-planar wavefronts 80'. Non-planar wavefronts 80' may then reflect off deformed region 76 of lateral surface 74.

In reflecting non-planar wavefronts 80' for the first time, the non-planar shape (profile) of deformed region 76 in lateral surface 74 may alter (distort) non-planar wavefronts 80' in a manner that counteracts or reverses the non-planar shape of non-planar wavefronts 80'. Deformed region 76 of lateral surface 74 will therefore reflect non-planar wavefronts 80' as planar (undistorted) wavefronts 80". In other words, the distortion to the wavefronts in image light 38 produced by the waveguide deformation mitigation structure may serve to mitigate, compensate (pre-compensate), or cancel out the distortion to image light 38 produced by deformed region 76 of lateral surface 74 in reflecting the image light 38 coupled into waveguide 50 by reflective input coupling prism 62. The planar wavefronts 80" of image light 38 will therefore be received at eye box 24 without distortion and with maximal resolution to the images in image light 38.

The example of FIG. 3 is merely illustrative. Other input coupling structures may be used. For example, in other implementations, input coupler 52 may include a transmissive input coupling prism. The transmissive input coupling prism may be mounted to lateral surface 74 of waveguide substrate 70. The transmissive input coupling prism may redirect image light 38 from display module 20A into waveguide 50 within the TIR range of waveguide 50. In these examples, deformed region 76 may be in lateral surface 68 of waveguide substrate 66. The image light 38 coupled into waveguide 50 by the transmissive input coupling prism may first reflect off deformed region 76 in lateral surface 68 in propagating along waveguide 50 via total internal reflection.

Figure 4:
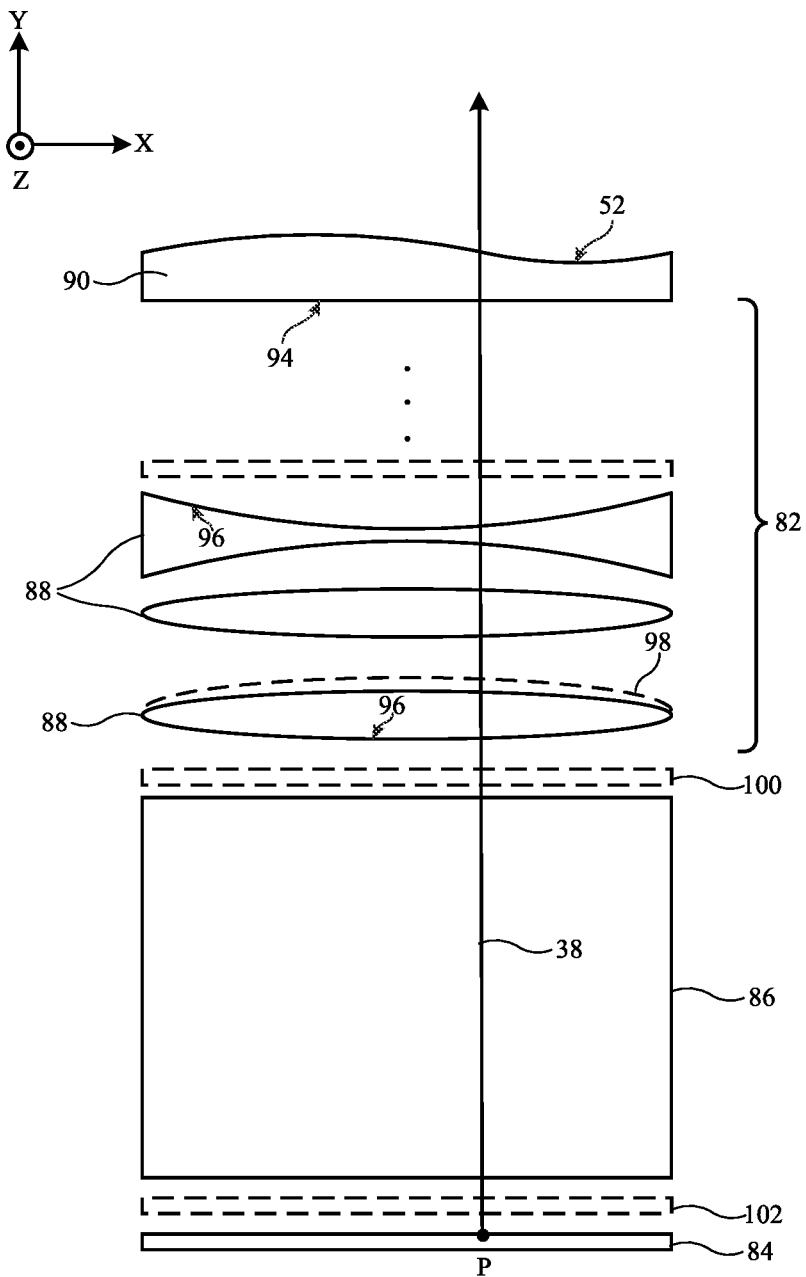
FIG. 4 is a top view of an illustrative display module having a waveguide deformation mitigation structure in accordance with some embodiments.

FIG. 4 is a top view showing how display module 20A may include waveguide deformation mitigation structures. As shown in FIG. 4, display module 20A may include a display panel such as display panel 84 having multiple pixels P for conveying image data within image light 38. Display panel 84 may be an emissive display panel that emits image light 38 (e.g., a light emitting diode (LED) array, a micro LED (uLED) array, a laser array, etc.) or may be a reflective display panel that produces image light 38 by modulating image data onto illumination light produced by light sources within display module 20A (e.g., a DMD panel, an LCOS panel, etc.), as examples.

Image light 38 from display panel 84 may pass through prism 86. Prism 86 may, for example, direct illumination light to display panel 84 in implementations where display panel 84 is a reflective display panel. Prism 86 may be omitted if desired. Display module 20A may include collimating optics 82 optically interposed between display panel 84 and input coupler 56 (FIG. 2). Collimating optics 82 may sometimes be referred to herein as eyepiece optics 82 or eyepiece 82. Collimating optics 82 may, for example, focus image light 38 onto the input pupil of waveguide 50. Collimating optics 82 may include one or more lens elements 88. Each lens element 88 may have one or more concave surfaces, convex surfaces, spherical surfaces, aspherical surfaces, freeform curved surfaces, fisheye surfaces, etc. One or more lens elements 88 may impart optical power to image light 38 if desired.

As shown in FIG. 4, display module 20A may include one or more waveguide deformation mitigation structures such as waveguide deformation mitigation structure 90. Waveguide deformation mitigation structure 90 may sometimes also be referred to herein as field dependent correction structure 90, field dependent phase correction structure 90, wavefront correction structure 90, wavefront pre-compensation structure 90, wavefront distortion structure 90, waveguide distortion pre-compensation structure 90, (optical) waveguide distortion mitigation structure 90, (optical) waveguide distortion compensation structure 90, (optical) waveguide deformation compensation structure 90, or simply as optical structure 90 or optics 90.

In the example of FIG. 4, waveguide deformation mitigation structure 90 is an optically transparent optical wedge having a first surface 94 and an opposing second surface 92. Surface 92 may be curved such that surface 92 transmits image light 38 while imparting the image light with a field dependent correction or pre-compensation that mitigates (compensates for) the distortion to image light 38 produced by deformed region 76 of waveguide 50 after reflecting image light 38 (e.g., that distorts, deforms, alters, or de-planarizes the wavefronts of image light 38 so the image light has non-planar wavefronts 80 of FIG. 3 at the entrance pupil of waveguide 50). Surface 92 may, for example, be spherically curved, elliptically curved, curved in two dimensions, curved in three dimensions, freeform curved, etc. This is merely illustrative. Surface 94 may be configured to alter the wavefronts of image light 38 (e.g., surface 94 may be curved whereas surface 92 is planar) or the combination of surfaces 94 and 92 may be configured to alter the wavefronts of image light 38. Waveguide deformation mitigation structure 90 need not be an optical wedge and may include, in general, an optical plate (e.g., a phase plate), coating, film, lens, lens surface, combinations of these, or any other desired optical structure that transmits image light 38 while imparting the image light with a field dependent correction or pre-compensation that mitigates (compensates for) the distortion to image light 38 produced by deformed region 76 of waveguide 50 after reflecting image light 38 (e.g., that distorts, deforms, alters, or de-planarizes the wavefronts of image light 38 so the image light has non-planar wavefronts 80 of FIG. 3 at the entrance pupil of waveguide 50).

Waveguide deformation mitigation structure 90 may, as examples, be optically interposed between collimating optics 82 and waveguide 50 (as shown in the example of FIG. 4), may be interposed between different lens elements 88 in collimating optics 82 (e.g., at locations such as location 104), may be layered onto a surface of one or more lens elements 88 in collimating optics 82 (e.g., at locations such as location 98), may be optically interposed between collimating optics 82 and prism 86 (e.g., at locations such as location 100), or may be located at or adjacent to display panel 84 such as at a location optically interposed between collimating optics 82 or prism 86 and display panel 84 (e.g., at locations such as location 102).

If desired, one or more surfaces 96 of one or more lens elements 88 may be provided with a curvature or a curved portion that is selected to transmit image light 38 while imparting the image light with a field dependent correction or pre-compensation that mitigates (compensates for) the distortion to image light 38 produced by deformed region 76 of waveguide 50 after reflecting image light 38 (e.g., that distorts, deforms, alters, or de-planarizes the wavefronts of image light 38 so the image light has non-planar wavefronts 80 of FIG. 3 upon entry into waveguide 50). In other words, one or more lens elements 88 in collimating optics 82 may have a surface 96 that is curved to configure that lens element to form waveguide deformation mitigation structure 90.

Display module 20A may include more than one waveguide deformation mitigation structure 90 (e.g., at two or more of the locations described above) that collectively transmit image light 38 while imparting the image light with a field dependent correction or pre-compensation that mitigates (compensates for) the distortion to image light 38 produced by deformed region 76 of waveguide 50 after reflecting image light 38 (e.g., that distorts, deforms, alters, or de-planarizes the wavefronts of image light 38 so the image light has non-planar wavefronts 80 of FIG. 3 upon entry into waveguide 50). The components of display module 20A may each be mounted within a shared display module housing if desired. In another implementation, waveguide deformation mitigation structure 90 may be mounted to display module 20A external to the display module housing.

Figure 5:
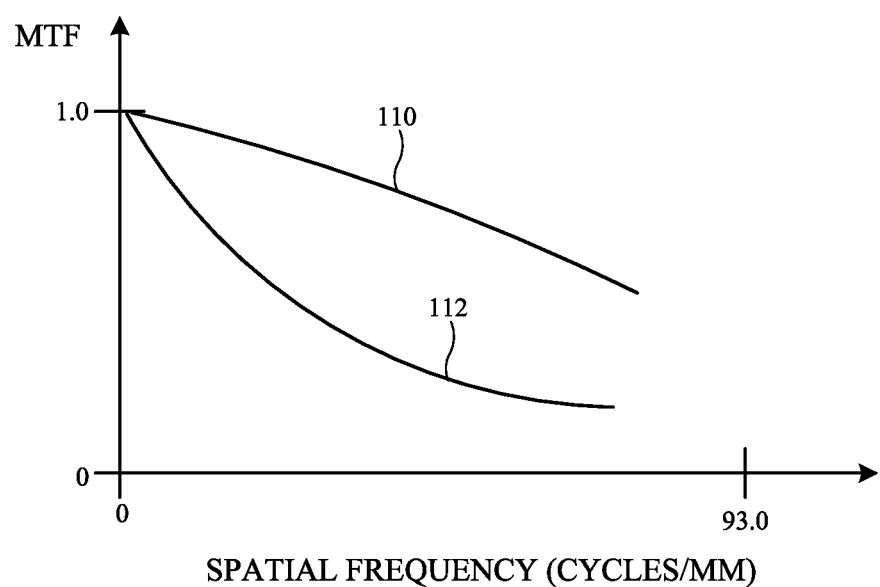
FIG. 5 is a plot of display performance (modulation transfer function) showing how a waveguide deformation mitigation structure in a display module may optimize the optical performance of a display in accordance with some embodiments.

FIG. 5 is a plot of display performance (modulation transfer function (MTF)) as a function of spatial frequency in cycles per mm. MTF is a metric of the sharpness of the images provided to eye box 24 by image light 38. Curve 112 plots the MTF of image light 38 in scenarios where waveguide deformation mitigation structure 90 is omitted. As shown by curve 112, the MTF of image light 38 is relatively low in the absence of waveguide deformation mitigation structure 90 because deformed region 76 of waveguide 50 produces non-planar (distorted) wavefronts 78" (FIG. 3) that are directed towards eye box 24 by waveguide 50.

Curve 110 plots the MTF of image light 38 in scenarios where display module 20A includes waveguide deformation mitigation structure 90. As shown by curve 110, the MTF of image light 38 is relatively high because waveguide deformation mitigation structure 90 causes image light 38 to have planar wavefronts 80" (FIG. 3) after the distorted non-planar wavefronts 80 of image light 38 reflect off deformed region 76 of waveguide 50. In this way, waveguide deformation mitigation structure 90 may optimize the optical performance of the display despite the presence of manufacturing deformations in waveguide 50 due to the lamination of grating medium 72 between waveguide substrates 66 and 70.

The foregoing is merely illustrative and various modifications can be made to the described embodiments. The foregoing embodiments may be implemented individually or in any combination.

What is claimed is:

1. An electronic device comprising:
   a display panel configured to produce light;
   a waveguide having first and second waveguide substrates and a grating medium interposed between the first and second waveguide substrates, wherein the first waveguide substrate has a lateral surface with a deformed region;
   an optical coupler in the grating medium and configured to direct the light out of the waveguide;
   an input coupler on the waveguide and configured to couple the light into the waveguide at an angle that directs the light to reflect off the deformed region of the lateral surface; and
   optics optically coupled between the display panel and the input coupler, wherein the optics are configured to distort a wavefront of the light to mitigate distortion of the wavefront produced by subsequent reflection of the light off of the deformed region of the lateral surface.

2. The electronic device of claim 1, wherein the first waveguide substrate is interposed between the grating medium and the display module and wherein the input coupler comprises a reflective input coupling prism mounted to the second waveguide substrate.

3. The electronic device of claim 1, wherein the second waveguide substrate is interposed between the grating medium and the display module and wherein the input coupler comprises a transmissive input coupling prism mounted to the second waveguide substrate.

4. The electronic device of claim 1, wherein the optics comprise an optical wedge having a curved surface.

5. The electronic device of claim 4, wherein the curved surface comprises a freeform curved surface.

6. The electronic device of claim 1, further comprising:
   collimating optics optically interposed between the display panel and the input coupler; and
   a prism optically interposed between the display panel and the collimating optics.

7. The electronic device of claim 6, wherein the optics comprises a curved surface of a lens element in the collimating optics.

8. The electronic device of claim 6, wherein the collimating optics comprises first and second lens elements and wherein the optics are interposed between the first and second lens elements.

9. The electronic device of claim 6, wherein the collimating optics comprises a lens element and wherein the optics are layered on the lens element.

10. The electronic device of claim 6, wherein the optics are optically interposed between the prism and the collimating optics.

11. The electronic device of claim 6, wherein the optics are optically interposed between the collimating optics and the input coupler.

12. The display of claim 6, wherein the optics are optically interposed between the display panel and the prism.

13. The electronic device of claim 6, wherein the display panel comprises a reflective display panel selected from the group consisting of: a digital micromirror device (DMD) display panel and a liquid crystal on silicon (LCOS) display panel.

14. The electronic device of claim 1, wherein the optics comprise a plurality of optical wedges.

15. The electronic device of claim 1, wherein the optical coupler comprises an optical component selected from the group consisting of: a volume hologram, a surface relief grating, and a louvered mirror.

16. The electronic device of claim 1, wherein the optical coupler comprises an optical coupler selected from the group consisting of: a cross-coupler, an output coupler, and an interleaved coupler.

* * * * *